US009540030B2

(12) United States Patent
Stinebring et al.

(10) Patent No.: US 9,540,030 B2
(45) Date of Patent: Jan. 10, 2017

(54) STEERING COLUMN ASSEMBLY WITH IMPROVED BEARING ASSEMBLY

(71) Applicants: Scott A. Stinebring, Auburn, MI (US); Michael W. Clark, Essexville, MI (US); Robert D. Maida, Pinconning, MI (US)

(72) Inventors: Scott A. Stinebring, Auburn, MI (US); Michael W. Clark, Essexville, MI (US); Robert D. Maida, Pinconning, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 20 days.

(21) Appl. No.: 13/796,583

(22) Filed: Mar. 12, 2013

(65) Prior Publication Data
US 2014/0260757 A1    Sep. 18, 2014

(51) Int. Cl.
*B62D 1/16*     (2006.01)
*F16C 33/58*    (2006.01)
*F16C 33/60*    (2006.01)

(52) U.S. Cl.
CPC .............. *B62D 1/16* (2013.01); *F16C 33/583* (2013.01); *F16C 33/60* (2013.01)

(58) Field of Classification Search
CPC ....................................................... B62D 1/16
USPC .... 384/499, 506, 513, 515; 280/771; 74/492
See application file for complete search history.

(56) References Cited

U.S. PATENT DOCUMENTS

| 1,202,876 | A | * | 10/1916 | Moore | F16C 19/49 384/564 |
| 3,885,840 | A | * | 5/1975 | Neder | 384/536 |
| 5,002,404 | A | * | 3/1991 | Zernickel et al. | 384/448 |
| 6,158,896 | A | * | 12/2000 | Zernickel | F16C 33/60 384/506 |
| 6,513,984 | B1 | * | 2/2003 | Hobaugh, II | B62D 1/16 384/537 |
| 6,964,211 | B1 | * | 11/2005 | St. Myer | B62D 1/16 280/779 |
| 7,007,386 | B1 | * | 3/2006 | Stover | 29/898.07 |
| 7,637,667 | B1 | * | 12/2009 | Schaub | 384/536 |
| 8,291,596 | B2 | * | 10/2012 | Cymbal et al. | 29/898.063 |
| 8,317,403 | B2 | * | 11/2012 | Nuissl | F16C 33/60 384/506 |
| 8,926,186 | B2 | * | 1/2015 | Wolf | F16C 19/49 384/454 |

(Continued)

FOREIGN PATENT DOCUMENTS

SE          FR 2816999 A1 *  5/2002  .............. B62D 1/16

*Primary Examiner* — Ruth Ilan
(74) *Attorney, Agent, or Firm* — Cantor Colburn LLP

(57) ABSTRACT

A steering column bearing assembly is disposed between an upper column jacket and a steering control shaft, supporting the steering control shaft for rotation within the upper column jacket. The steering column bearing assembly comprises an inner race, an outer race, and a plurality of ball bearings disposed between the inner race and the outer race, each ball bearing having a ball bearing diameter. The inner race and the outer race define an annular cavity in which the plurality of ball bearings is disposed. The annular cavity has an interior column opening defined between an outer edge surface of the inner race and an inner edge surface of the outer race. The outer edge diameter is less than a sum of the inner edge diameter and the ball bearing diameter.

5 Claims, 5 Drawing Sheets

(56) References Cited

U.S. PATENT DOCUMENTS

2005/0105838 A1* 5/2005 Brauer .................... F16C 19/20
                                                        384/492
2011/0241327 A1* 10/2011 Montboeuf et al. .......... 280/775

* cited by examiner

STEERING COLUMN ASSEMBLY WITH IMPROVED BEARING ASSEMBLY

BACKGROUND OF THE INVENTION

The present invention relates to steering column assemblies and more particularly to a steering column assembly supported on an improved bearing assembly.

A steering column assembly includes a steering shaft supported by an upper steering column bearing assembly. If one or more of the ball bearings of the upper steering column bearing assembly were to become liberated, the liberated ball bearings could become wedged in the steering column assembly, causing a decrease in vehicle control.

In a conventional bearing assembly, the ball bearings are retained within the bearing assembly between an inner race and an outer race. When the ball bearings are distributed evenly along the circumferentially direction about the central axis of the bearing assembly, an annular gap defined between the inner race and the outer race has a substantially uniform radial dimension at all positions along the annular gap. Contrariwise, when the ball bearings are distributed unevenly along the circumferentially direction, the radial dimension of the annular gap may vary substantially between positions along the annular gap.

For example, if all of the ball bearings were to migrate to one side of the bearing assembly, a distance between the inner race and the outer race at the opposing side of the bearing assembly may be able to decrease substantially, resulting in a corresponding increase in the distance between the inner race and the outer race in the vicinity of the ball bearings. As a result, the radial dimension of the annular gap at that circumferential position might be sufficiently large that one or more ball bearings may become liberated from the bearing assembly.

Accordingly, it is desirable to have a steering column assembly supported on an improved bearing assembly in which the potential for release of one or more ball bearings is decreased substantially.

SUMMARY OF THE INVENTION

In one exemplary embodiment of the invention, a steering column assembly comprises an upper column jacket, through which a steering control shaft is supported for rotation about a longitudinal column axis, and a steering column bearing assembly disposed between the upper column jacket and the steering control shaft for supporting the steering control shaft for rotation about the longitudinal column axis within the upper column jacket. The steering column bearing assembly comprises an inner race, an outer race, and a plurality of ball bearings disposed between the inner race and the outer race, each ball bearing having a ball bearing diameter.

The inner race and the outer race define an annular cavity there-between, and the plurality of ball bearings is disposed in the annular cavity. The annular cavity has an interior column opening at an inner axial end of the annular cavity and an extra-column opening at an exterior axial end of the annular cavity. The interior column opening is defined between an outer edge surface of the inner race and an inner edge surface of the outer race. The outer edge surface has an outer edge diameter, and the inner edge surface has an inner edge diameter. The outer edge diameter is less than a sum of the inner edge diameter and the ball bearing diameter.

In a further aspect of the invention, a bearing assembly comprises an inner race, an outer race, and a plurality of ball bearings disposed between the inner race and the outer race, each ball bearing having a ball bearing diameter. The inner race and the outer race define an annular cavity there-between, and the plurality of ball bearings being disposed in the annular cavity. The annular cavity being has an interior column opening at an inner axial end of the annular cavity and an extra-column opening at an exterior axial end of the annular cavity. The interior column opening is defined between an outer edge surface of the inner race and an inner edge surface of the outer race. The outer edge surface having an outer edge diameter, and the inner edge surface having an inner edge diameter, wherein the outer edge diameter is less than a sum of the inner edge diameter and the ball bearing diameter.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 3:
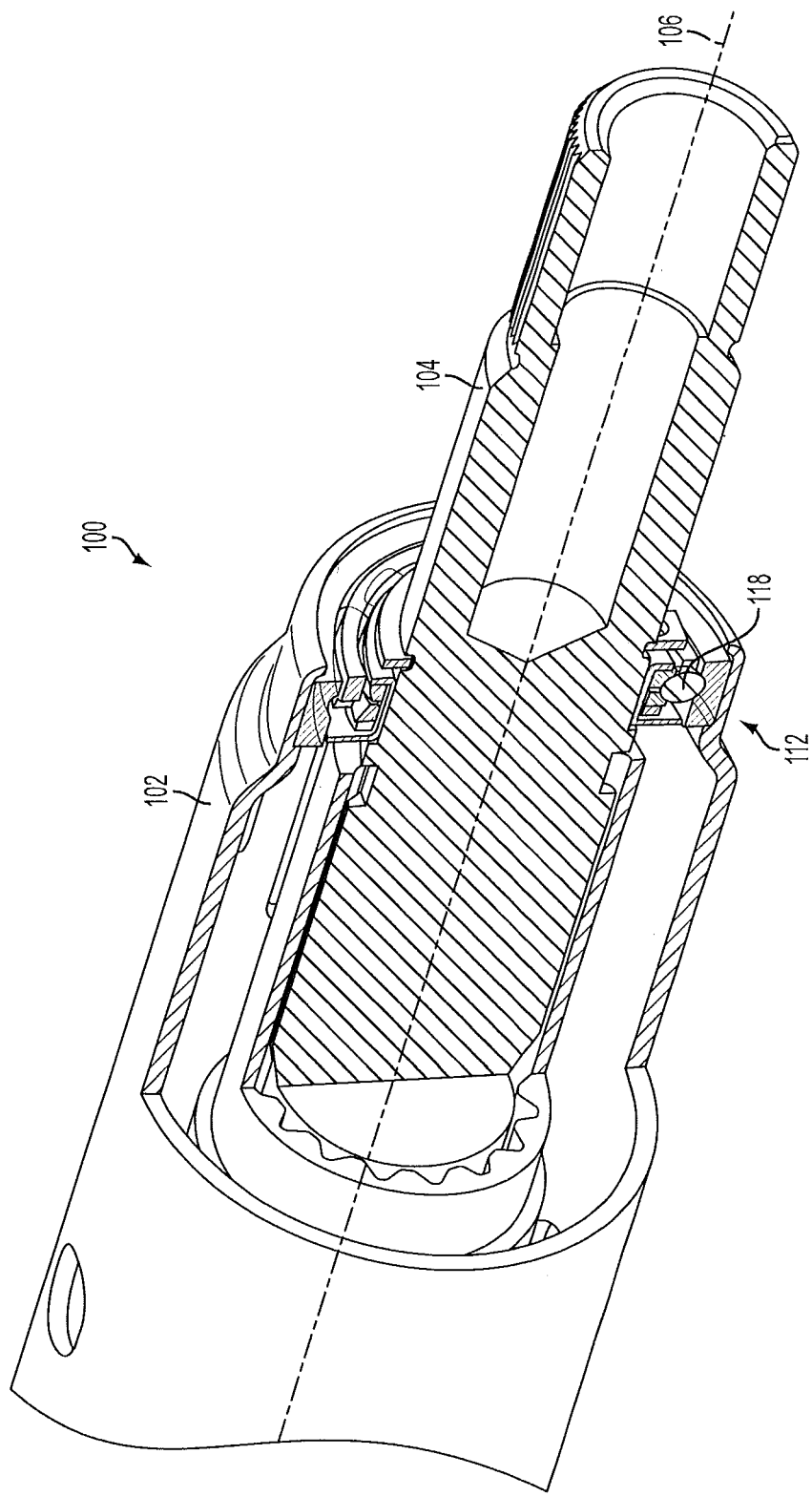
FIG. 3 shows a perspective view of a portion of a steering column assembly, with segments of the steering column assembly cut away to show otherwise hidden aspects steering column assembly.
Figure 4:
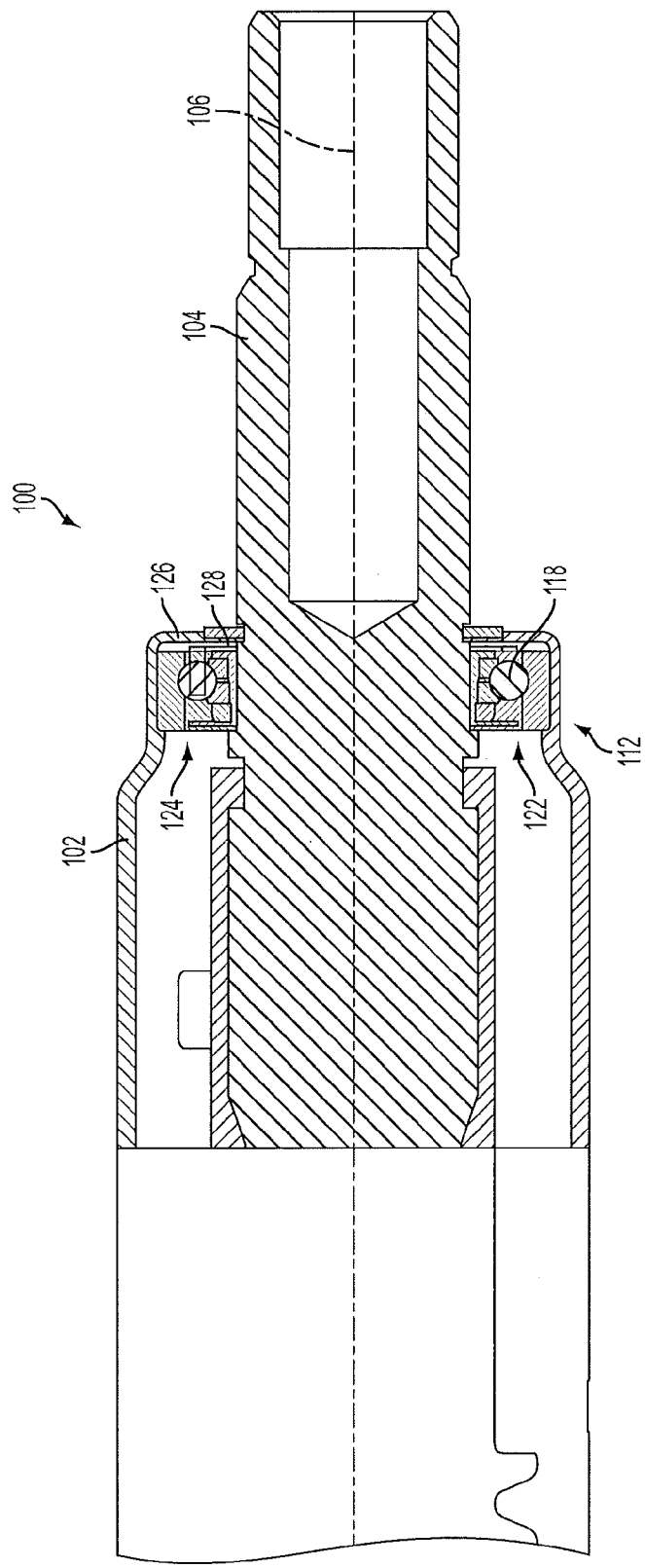
FIG. 4 shows a side view of a portion of a steering column assembly, with segments of the steering column assembly cut away to show otherwise hidden aspects steering column assembly.

Referring now to the Figures, where the invention will be described with reference to specific embodiments, without limiting same, FIG. 3 and FIG. 4 show respective perspective and side views of a steering column assembly 100 in accordance with the invention. As shown in FIG. 3 and FIG. 4, the steering column assembly 100 comprises an upper column jacket 102, through which a steering control shaft 104 is supported for rotation about a longitudinal column axis 106. At an operator end (i.e., an upper end), the steering control shaft 104 is configured for interacting with a steering wheel or other user control device (not shown) for facilitating user control of the vehicle. At an opposite end (i.e., a lower end), the steering control shaft 104 is coupled (e.g., via an intermediate shaft and/or one or more gear mechanisms) to a steerable wheel of the vehicle. Thus, as an operator rotates a steering wheel of the vehicle, the steering control shaft 104 rotates about the longitudinal column axis 106, and steering control of the vehicle is provided.

In an exemplary embodiment, the steering column assembly 100 comprises an upper column jacket 102, through which a steering control shaft 104 is supported for rotation about a longitudinal column axis 106. The steering column assembly 100 also comprises a steering column bearing assembly 112 disposed between the upper column jacket 102 and the steering control shaft 104 for supporting the steering control shaft 104 for rotation about the longitudinal column axis 106 within the upper column jacket 102.

Figure 1:
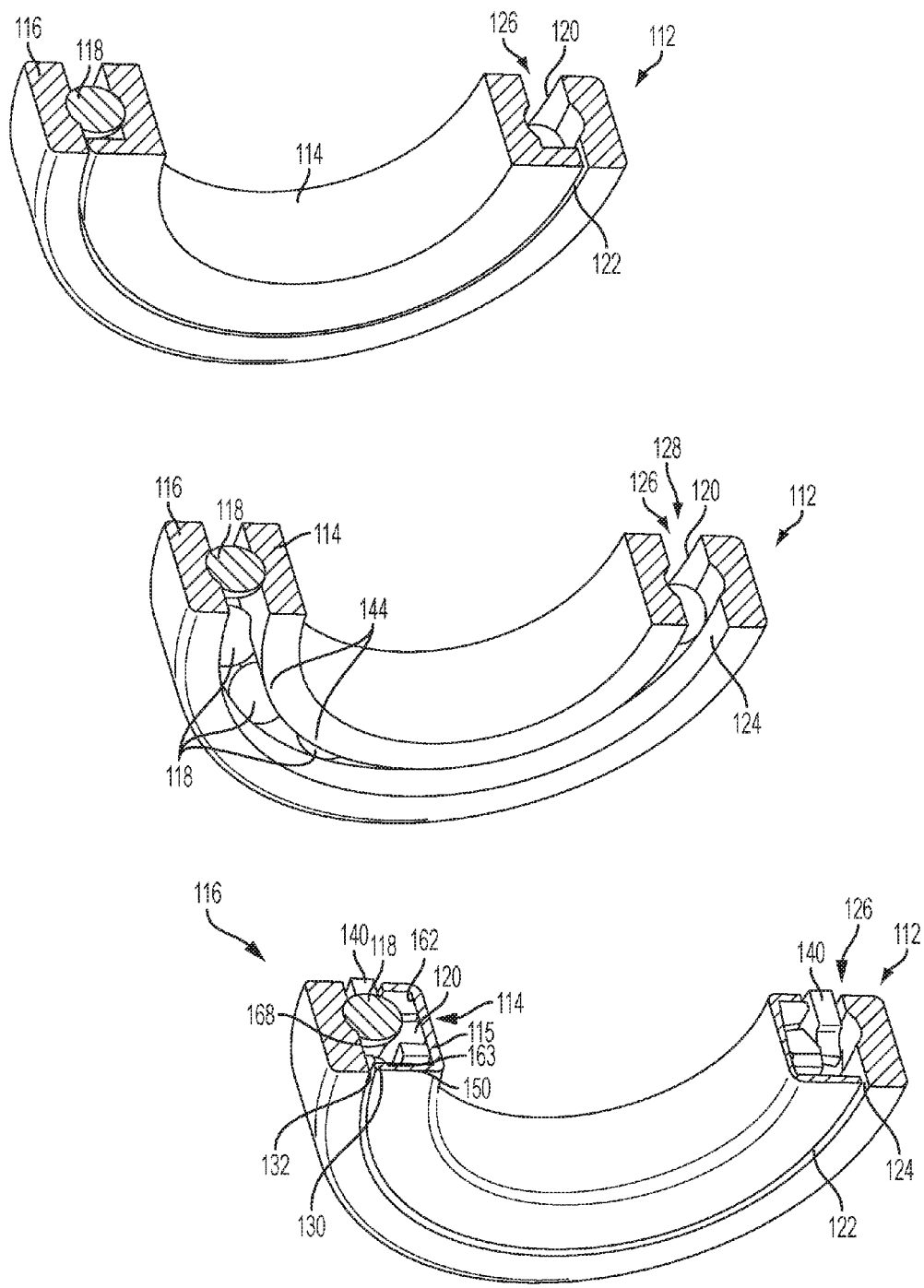
FIG. 1 shows three perspective views of exemplary steering column bearing assemblies with portions of the steering column bearing assemblies cut away to reveal otherwise hidden aspects thereof.
Figure 2:
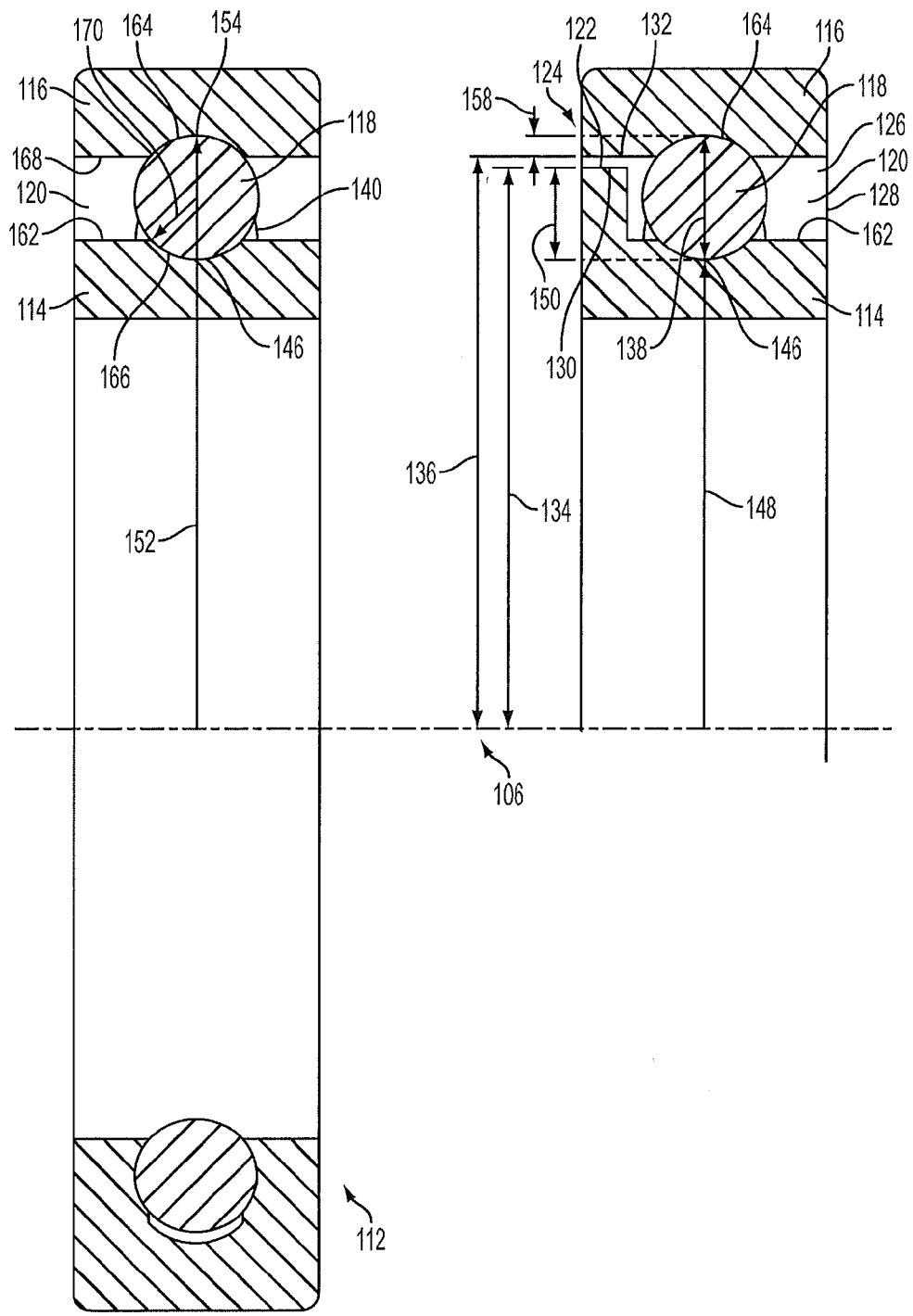
FIG. 2 shows partial side views of an exemplary embodiments of steering column bearing assemblies disposed about an axial centerline.
Figure 5:
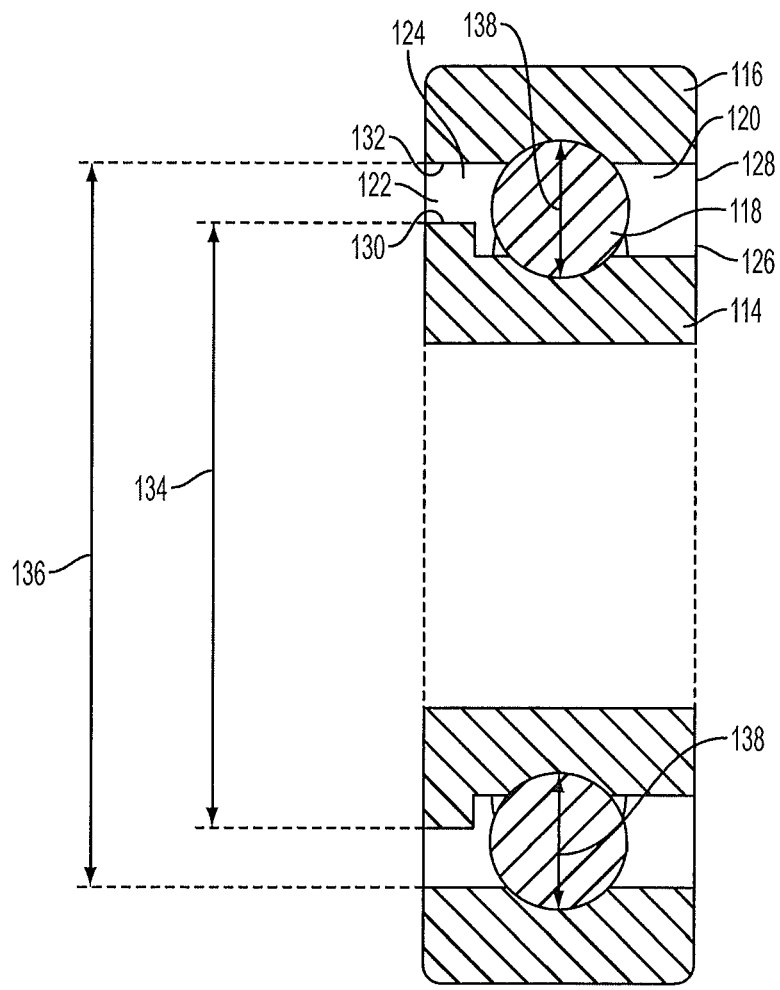
FIG. 5 shows a side view of an exemplary steering column bearing assembly with portions of the steering column bearing assembly cut away to reveal otherwise hidden aspects of the steering column bearing assembly.

FIG. 1 shows a perspective view of embodiments of steering column bearing assembly 112 with portions of the steering column bearing assembly 112 cut away to reveal otherwise hidden aspects of the steering column bearing assembly 112. Similarly, FIGS. 2 and 5 show side views of exemplary steering column bearing assemblies. As shown in FIGS. 1, 2, and 5, in an exemplary embodiment, the steering column bearing assembly 112 comprises an inner race 114, an outer race 116, and a plurality of ball bearings 118 disposed in an annular cavity 120 defined by the inner race 114 and the outer race 116, between the inner race 114 and the outer race 116.

The annular cavity 120 has an interior column opening 122 at an inner axial end 124 of the annular cavity 120 and an extra-column opening 126 at an exterior axial end 128 of the annular cavity 120. The interior column opening 122 is defined between an outer edge surface 130 of the inner race 114 and an inner edge surface 132 of the outer race 116. The inner race 114 is configured so that outer edge surface 130 is disposed at an outer edge diameter 134. The outer race 116 is configured so that the inner edge surface 132 is disposed at an inner edge diameter 136. Each ball bearing 118 has a ball bearing diameter 138. Specific combinations of the outer edge diameter 134, the inner edge diameter 136, and the ball bearing diameter 138 are selected and configured such that, even when the plurality of ball bearings 118 are concentrated near only one circumferential location within the annular cavity 120 (i.e., no ball bearings 118 are positioned near an opposing circumferential location within the annular cavity 120), the inner race 114 and the outer race 116 cooperate so as to prevent an escape of a ball bearing 118 from the annular cavity 120 through the interior column opening 122. The extra-column opening 126 is disposed opposite the interior column opening 122. The extra-column opening 126 is disposed between an outer race surface and an inner race surface. An interior column opening width is less than an extra-column opening width.

In an exemplary embodiment, the outer edge distance or diameter 134, the inner edge distance or diameter 136, and the ball bearing diameter 138 are selected and configured such that the inner edge distance or diameter 136 is less than a sum of the outer edge distance or diameter 134 and the ball bearing diameter 138. Put another way, in accordance with such an exemplary embodiment, the outer edge distance or diameter 134, the inner edge distance or diameter 136, and the ball bearing diameter 138 are selected and configured such that a difference between the outer edge distance or diameter 134 and the inner edge distance or diameter 136 is less than the ball bearing diameter 138. Put yet another r way, in accordance with such an exemplary embodiment, the outer edge distance or diameter 134, the inner edge distance or diameter 136, and the ball bearing diameter 138 are selected and configured such that the ball bearing diameter 138 is greater than a difference between the outer edge distance or diameter 134 and the inner edge distance or diameter 136.

In an exemplary embodiment, a bearing assembly may comprise a ball bearing separator ring 140. The ball bearing separator ring 140 is received within the extra-column opening 126 and is disposed about the plurality of ball bearings 118. The ball bearing separator ring 140 defines a plurality of pockets, in which the ball bearings 118 are disposed. The ball bearing separator ring 140 may be configured so as to maintain desired separations between the ball bearings 118. In one embodiment, the circumferential separation 144 between pairs of adjacent ball bearings 118 is uniform. In another embodiment, the circumferential separation 144 between pairs of adjacent ball bearings 118 is non-uniform.

In an exemplary embodiment, the inner race 114 has a first inner race portion 115 that defines an inner race surface 162 that faces towards and is disposed substantially parallel to an outer race surface of the outer race 116. The inner race surface 162 having one or more inner ball bearing contact lines 146 that are in close proximity to, (e.g., in contact with) one or more of the plurality of ball bearings 118. The one or more inner ball bearing contact lines 146 are disposed at an inner radius position 148, radially inward from the path of the plurality of ball bearings 118. The inner race 114 includes an inner race extension 150 that extends from the inner ball bearing contact line 146 to the outer edge surface 130, the outer edge surface 130 being defined at a radial position equal to one half of the outer edge diameter 134. In at least one embodiment, the inner race extension 150 extends from the first inner race portion 115. The inner race extension 150 is disposed substantially perpendicular to the first inner race portion 115. The inner race extension 150 includes a second inner surface 163 extending between the outer edge surface 130 and the inner race surface 162. The second inner surface 163 is disposed substantially perpendicular to each of the outer edge surface 130 and the inner race surface 162. In such an embodiment, the annular cavity 120 is defined by the outer race surface 168, the outer edge surface 130, the second inner race surface 163, and the inner race surface 162.

Similarly, the outer race 116 defines an outer race surface 168 having one or more an outer ball bearing contact lines 154 that are in close proximity to, (e.g., in contact with) one or more of the plurality of ball bearings 118. The one or more an outer ball bearing contact lines 154 are disposed at an outer radius position 152 that is radially outward from the path of the plurality of ball bearings 118. In an exemplary embodiment, the outer race 116 includes an outer race extension 158 that extends from the outer ball bearing contact line 154 to the inner edge surface 132, the inner edge surface 132 being defined at a radial position equal to one half of the inner edge distance or diameter 136.

In an exemplary embodiment, the plurality of ball bearings 118 is disposed in an evenly spaced relationship along a circumferential direction of the annular cavity 120. Accordingly, when the plurality of ball bearings 118 is so distributed, each individual ball bearing 118 of the plurality of ball bearings 118 maintains a distance between the outer race 116 and the inner race 114, and therefore between the outer ball bearing contact line 154 and the inner ball bearing contact line 146. Consequently, the even distribution of ball bearings 118 tends to maintain an even spacing between the outer edge surface 130 and the inner edge surface 132 and thus a relatively even width of the interior column opening 122 at all points along the circumference of the annular cavity 120.

As discussed above, specific combinations of the outer edge distance or diameter 134, the inner edge distance or diameter 136, and the ball bearing diameter 138 are selected and configured such that, even when the plurality of ball bearings 118 are concentrated near only one circumferential location within the annular cavity 120 (i.e., no ball bearings 118 are positioned near an opposing circumferential location within the annular cavity 120), the inner race 114 and the outer race 116 cooperates so as to prevent an escape of a ball bearing 118 from the annular cavity 120 through the interior column opening 122. Thus, where the ball bearing diameter 138 is greater than a difference between the outer edge distance or diameter 134 and the inner edge distance or diameter 136, even if the inner race 114 and the outer race 116 were to shift to a position wherein their central axes were no longer aligned or, in an extreme case, wherein the outer edge surface 130 were to contact the inner edge surface 132 at one circumferential location, a distance between the inner edge surface 132 and the outer edge surface 130 at an opposite circumferential location would be less than the diameter of the ball bearing 118. As a result, one or more of the plurality of ball bearings 118 would be prevented from escaping the annular cavity 120.

In an exemplary embodiment, the inner race 114 may define an inner ball bearing track 166 (e.g., cup) having a curved cross-sectional surface (i.e., a cupped track) with a radius of curvature substantially equal to a ball bearing radius 170 of the ball bearing 118. Accordingly, the one or more inner ball bearing contact lines 146 may be disposed within the inner ball bearing track 166 so as to better ensure the retention of the ball bearings 118 within the annular cavity 120.

Similarly, in an exemplary embodiment, the outer race 116 may define an outer ball bearing track 164 (e.g., cup) having a curved cross-sectional surface (i.e., a cupped track) with a radius of curvature substantially equal to the ball bearing radius 170 of the ball bearing 118. Accordingly, the one or more outer ball bearing contact lines 154 may be disposed within the outer ball bearing track 164 so as to better ensure the retention of the ball bearings 118 within the annular cavity 120.

Thus, in an exemplary embodiment, the invention facilitates retention of ball bearings within the annular cavity of the bearing assembly with improved reliability. The inner race extension is disposed and configured so as to block the balls from exiting the bearing in the event of a shift between the inner and outer races. The inner race extension provides for an opening, between the inner and outer races, that is less than the diameter of the ball bearings. The inner race extension may be applied to a retainer in a press-press style bearing assembly. The inner race extension may also be applied in a deep groove style bearing assembly. A spring retainer assembly is configured to retain the inner race assembly in an axial direction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
an upper column jacket;
a steering control shaft extending through the upper column jacket; and
a steering column bearing assembly disposed between the upper column jacket and the steering control shaft to rotatably support the steering control shaft, the steering column bearing assembly comprising:
an outer race having an outer race surface;
an inner race having
a first inner race portion that has an inner race surface that faces towards and is disposed parallel to the outer race surface, and
an inner race extension extending from the first inner race portion, the inner race extension disposed perpendicular to the first inner race portion, the inner race extension has
an outer edge surface disposed parallel to the outer race surface, and
a second inner race surface extending between the outer edge surface and the inner race surface, and
a plurality of ball bearings disposed within an annular cavity defined by the outer race surface, the outer edge surface, the second inner race surface, and the inner race surface,
the annular cavity defines an interior column opening disposed between the outer edge surface and an inner edge surface of the outer race surface of the outer race and an extra-column opening disposed opposite the interior column opening disposed between the outer race surface and the inner race surface, and
the outer race surface has a curved cross-sectional area with a radius of curvature equal to a radius of a ball bearing of the plurality of ball bearings so as to form an outer ball bearing track in which the plurality of ball bearings are disposed, and the inner race, the inner race extension, and the outer race are configured to retain the plurality of ball bearings therein.

2. A steering column assembly as described in claim claim 1, further comprising a ball bearing separator ring received within the extra-column opening and disposed about the plurality of ball bearings.

3. A steering column assembly as described in claim 2, wherein the ball bearing separator ring defines a plurality of pockets in which the plurality of ball bearings are disposed.

4. A steering column assembly as described in claim 3, wherein the ball bearing separator ring is configured so as to maintain a circumferential separation between pairs of adjacent ball bearings, the circumferential separation being uniform.

5. A steering column assembly as described in claim 1, wherein the inner race defines an inner race surface that is curved with a radius of curvature equal to a radius of the ball bearing so as to form an inner ball bearing track in which the plurality of ball bearings is disposed.

* * * * *